United States Patent [19]
Lahti

[11] Patent Number: 5,807,487
[45] Date of Patent: Sep. 15, 1998

[54] LAUNDROMAT WASTEWATER TREATMENT

[75] Inventor: William J. Lahti, Stony Brook, N.Y.

[73] Assignee: I.P. Licensing, Inc., Bohemia, N.Y.

[21] Appl. No.: 805,881

[22] Filed: Mar. 3, 1997

[51] Int. Cl.$^6$ .................................. C02F 1/42; C02F 1/52
[52] U.S. Cl. ..................... 210/665; 210/683; 210/709; 210/724; 210/726
[58] Field of Search ..................... 210/665, 667, 210/683, 709, 724, 726

[56] References Cited

U.S. PATENT DOCUMENTS

| | | | |
|---|---|---|---|
| 5,160,439 | 11/1992 | Dobrez et al. | 210/709 |
| 5,374,358 | 12/1994 | Kaniecki et al. | 210/708 |
| 5,433,853 | 7/1995 | Mamone | 210/709 |
| 5,433,863 | 7/1995 | Braden et al. | 210/708 |
| 5,454,956 | 10/1995 | Pennaz | 210/708 |
| 5,523,000 | 6/1996 | Falbaum et al. | 210/708 |
| 5,647,977 | 7/1997 | Arnaud | 210/167 |

*Primary Examiner*—Jay H. Woo
*Assistant Examiner*—Betsey J. Morrison
*Attorney, Agent, or Firm*—Marvin Feldman

[57] ABSTRACT

A method and apparatus for treating wastewater effluent from diversely laundered household wash as in a laundromat provides for collecting and holding the effluent in a first tank for at least an average wash cycle for equalization and to a pH of 8.5 to 11, and then transferring the equalized wastewater to a second tank for acidification to a first predetermined pH of not less than about 6.5 and preferably 6.5 to 6.9, and then adding a coagulant, preferably a PAC with a basicity of 45 to 50%, to effect a second predetermined pH of not less than about 5.0 and preferably 5.2 to 5.4 for coagulation at the second pH to form treated water and a sludge. The treated water is decanted from the sludge and filtered to remove 1 to 50 micron particulates. The filtered water is then passed through a weak base anion exchange resin to remove MBAS to provide treated water. The system produces treated water which meets present day stringent environmental standards for discharge to subsurface aquifers, surface or for reuse or recycle. This treatment has first and second treatment tanks in essentially an automated, continuous flow, in-structure, in-ground insulated tank system, in a non-toxic, moderate pH environment and requires minimal downtime with cost effective maintenance, and which eliminates outside treatment or discharge of environmentally proscribed wastewater. The treated warm water may optionally be sanitized such as by ozonation and then recycled as feedwater to the laundromat, thereby reducing water and energy costs.

23 Claims, 3 Drawing Sheets

LAUNDROMAT WASTEWATER TREATMENT

BACKGROUND OF THE INVENTION

1. Field of the Invention

The present invention relates to the treatment of wastewater, particularly wastewater effluent from household laundered wash or laundromats, as distinct from commercial laundry effluent.

2. Background and Discussion of the Prior Art

Laundromats desire to discharge their effluent to subsurface aquifers, or to the surface, or reuse the treated water as feedwater. Present day state and local environmental restrictions place severe limitations on the organic matter and solids permitted to be discharged to the environment. Laundromats desire an effluent treatment system which meets these present day rigorous environmental standards and yet permits essentially continuous operation with minimal downtime, and in which maintenance is achieved in a practical manner with minimal cost by persons of limited technical skill.

Environmental agencies in various locales throughout the country have recently set and enforced rigorous maximum discharge criteria standards for commercial wastewater. Laundromats in certain locales face the following wastewater effluent maximum permissible criteria:

| | |
|---|---|
| MBAS | 1.0 ppm |
| TSS | 30.0 ppm |
| TDS | 1000 ppm |
| Oil and grease | 15 ppm |
| pH | 6.5–8.5 |

"MBAS" refers to "methylene blue active substances", "TSS" refers to "total suspended solids", and "TDS" refers to "total dissolved solids", as determined by conventional testing methods well-known to those skilled in the art. "FOG" refers to "fats, oils and greases." "Oil and grease" is understood to mean essentially "FOG".

Laundromats face a particularly onerous burden in meeting the aforesaid criteria insofar as a typical laundromat effluent discharge is between 8,000 to 35,000 gallons/day and has the following broad range of characteristics:

| | |
|---|---|
| MBAS | 35–130 ppm |
| TSS | 70–130 ppm |
| TDS | 350–775 ppm |
| Oil and grease | 30–80 ppm |
| pH | 8.5–11.0 |

Commercial laundries, in contradistinction to laundromats, select and closely control the specific detergent and concentrations of same. Laundromats however are faced with the users' diverse detergents used in diverse concentrations. It has been found, by way of example, that detergent concentrations in the effluent are greater on weekends than on weekdays, and detergent materials and concentrations vary from moment to moment. Laundromats for the above and further reasons discussed infra have effluent discharge problems not generally faced in commercial laundry controlled operations.

One early attempt directed to a car wash or laundry effluent treatment is disclosed in U.S. Pat. No. 4,104,164, granted Aug. 1, 1978, to Chelton. Chelton disclosed a generalized approach to wastewater treatment. Chelton provided for a first stage treatment by a weir or gravity filtration of the effluent followed in seriatim by centrifugation, activated carbon adsorptive filtration, bag filtration and particulate filtration. Insofar as laundromat effluent particulates have a density close to that of water, the Chelton gravity filtration and centrifugation would effectively be inoperable for such use. It is doubtful that the Chelton system would be practical for laundromats, and could with any practical consistency ever meet the present stringent discharge standards before requiring extensive downtime and maintenance. Furthermore, by way of example, due to the types and concentration of containments present in laundromat wastewater, the Chelton activated carbon would be exhausted in a short period of time, necessitating extensive labor and expense to change the carbon bed. Other commercial laundry prior art systems were also directed to gravity and screens with oil/water separators as disclosed in U.S. Pat. No. 5,207,922, granted May 4, 1993 to McFarlan et al and U.S. Pat. No. 5,167,829, granted Dec. 1, 1992 to Diamond et al. The treated water from these commercial laundry operations was generally discharged for further treatment at publicly owned treatment works.

U.S. Pat. No. 5,246,560, granted Sep. 21, 1993 to Dobrez et al disclosed a commercial laundry water treatment to remove FOGs in which a cationic coagulant is fed inline with monitoring of the electric charge value of the water-coagulant mixture. The treated water was like the aforedescribed prior art required to be transported to and further treated by publicly owned treatment works. This approach is not suitable for laundromats which must remove all requisite contaminants to satisfy the present environmental standards. German Patent No. 3,344,275, discussed in Dobrez et al, disclosed a related method which required measuring diverse parameters of raw laundry wastewater and adding flocculant in response to cloudiness and adding alkali and/or acid in response to the measured pH value, with the pH of the wastewater adjusted to 7.5–9. These prior art treatment methods were unsuitable for laundromat operations or otherwise directed away from the present invention.

Commercial laundries may use amphoteric dicarboxylate amine based emulsifying detergents. Such detergent use is disclosed in U.S. Pat. No. 5,167,829 granted Dec. 1, 1992 to Diamond et al and U.S. Pat. No. 5,523,000, granted Jun. 4, 1996, granted to Falbaum et al. Falbaum et al disclosed an organic soil removal method which employs a cationic flocculant in necessary operative combination with an amphoteric dicarboxylate detergent in a pH change protocol. Household, as opposed to commercial, laundry detergents and builders avoid such amphoteric dicarboxylate detergents because as amine derivatives they are subject to chelating with heavy metal compounds to form solubilized toxic materials. This is particularly so where the laundromats desire to recycle all or part of the treated effluent. Falbaum et al, by virtue of requiring amphoteric dicarboxylates and creating such heavy metal toxicity, is inoperative for laundromat operations. See U.S. Pat. No. 3,870,648, granted Mar. 11, 1975 to Grifo at col. 3, lines 3–27 and col. 4 lines 9–15, for a discussion of this heavy metal toxicity problem in household laundered wash. The present invention avoids the introduction and use of toxic heavy metal chelating or solubilizing compounds such as amphoteric carboxylates which as amine derivatives chelate and solubilize toxic heavy metals. As a consequence, the treated water of the present invention is substanially free of toxic heavy metals, and may therefore be recycled to the laundromat or discharged to the surface or subsurface.

The commercial laundry prior art, namely Falbaum et al and Diamond et al, disclosed FOG separation or flocculation at exceptionally low pH values of about 1.5 to 4.5 in order to remove substantial FOGs to where the wastewater had a FOG concentration of about 100 ppm or lower. In marked contrast, laundromats require wastewater discharge with oil and grease concentrations of less than 15 ppm, and additionally require the substantial removal of other environmentally proscribed contaminants, in a moderate pH environment because such highly acidic environments necessitate specialized equipment and maintenance and are not suitable or practical for neighborhood laundromats.

A recent prior art system directed to treating laundromat effluent is shown in FIG. 1 infra. FIG. 1 shows a treatment system wherein laundry effluent 10 first passes through in-frame window screens 11 to remove large particulates, as was typical of the prior art. The screened wastewater is pumped by pump 12 to a multi-media or particulate filter 13 which contained diverse particulates such as sand, anthracite coal, and garnet. The filtered water was then transferred to ion exchange resin vessels 14, with a regenerant solution holding tank 15. Effluent 16 from vessels 14 was then transferred to leaching pools (not shown). A city source cold water backwash 17 to filters 13 and 14 was used. While the FIG. 1 system provided some improved treatment of the wastewater effluent, the quality of the effluent was inconsistent and the filters 13 and 14 would readily become clogged or fouled. The FIG. 1 system was not suitable for practical, cost effective laundromat operations.

Referring to FIG. 2 there is shown a more recent prior art wastewater treatment system for laundromats. The system, in general terms, comprises a laundromat wastewater effluent line 20, bag filters 21 disposed within lint trap 22, and pump 23 operably disposed in lint trap 22 pumps the lint trap outflow to a second bag filter 24. The second bag filtered water 38 is then pumped by pump 37 to a multi-media or particulate filter 25 to remove suspended solids. The outflow 41 from filter 25 is pumped by pump 42 to a FOG removal or absorptive filter 26 which also removes residual fine solids. The FOG removed outflow water 40 from filter 26 is treated in a strong base anion exchange resin in vessels 27 to remove MBAS. Cold water backwash 63 is provided. A regenerant solution 28 containing a biocide and/or oxidative chemical 61 is introduced at 65 to vessels 27 during an automatic intermittent cleaning process to control bacterial growth and to reduce fouling of the ion exchange resin, and the spent regenerant 55 is discharged at 64. The fully treated effluent 29 from vessels 27 is sent to leaching pools (not shown) to subsurface aquifers, surface or for reuse or subsequent purification. The laundromat wastewater effluent 20 is first treated by relatively fine mesh filter bags 21. Bags 21 are rated at 100 to 800 microns, and preferably 100 to 400 microns, with about 300 microns being most preferred. Bags 21 are mounted to each bottom orifice 32 of opposed drop tees or joints 30 with an opposedly disposed top orifice 31. Any effluent overflow, such as by an aberrant surge in flow, passes through top orifice 31 directly into trap 22. The bags 21 are operatively disposed within trap 22 so that the filtered water passes first to a turbulent flow upper level 33. The filtered water contains residual organic matter agglomerates which water then flows from the turbulent flow upper level 33 to the quiescent flow lower level 34 of trap 22, whereat the agglomerates further settle out. Overflow 45 from trap 22 is gravity fed to overflow holding tank 46 where a pump disposed in tank 46 is operatively interlocked with a float in trap 22 to pump return flow to effluent feed line or pipe 20 for a continuous even flow operation. Pump 23 pumps the first bag filtered water 36 to a second bag filter 24. Second bag filter 24 is approximately the same mesh size as first bag filter 21. In a preferred embodiment of the invention, the second bag filter 24 is somewhat coarser than the first bag filter 21. The immediately afore-described prior art systems was generally directed to and relied on multiple filtration stages wherein the wastewater first underwent gross filtration by weir, gravity and/or screen means for removal of relatively large particulates and agglomerates. This approach however caused rapid clogging and fouling of the filters, particularly the FOG absorptive filter 26, and was proven impractical and inoperable for laundromat operations. Furthermore, it was found that the linear alkyl sulfonates (LAS) typical of household detergents bonded to the strong base anion resin in an essentially irreversible manner causing ineffective wastewater treatment.

The laundromat art thus desired a method and apparatus for treating its diverse wastewater effluent in an essentially continuous operation, in a non-toxic, moderate pH environment, and with minimal maintenance and downtime, and yet importantly meet the present day stringent environmental discharge standards. The present invention provides that desired result.

SUMMARY OF INVENTION

The term "equalization" or "equalizing" as used hereinbefore and hereinafter throughout the specification and claims refers to laundromat effluent collection and retention in a large tank so as to average out the variations and permutations in the nature and concentration of effluent and to further provide a relatively consistent pH value for further treatment of the wastewater.

In broad terms the present invention is a method and apparatus in which acidification of the effluent is at a first predetermined pH and then adding a coagulant to the wastewater at the first pH to effect a second predetermined pH for coagulation at the second pH to provide nascent treated water and a sludge. The treated water is filtered and then passed through a weak base anion exchange resin to remove MBAS. The pH is finally adjusted to about neutral. The finally treated water meets the afore-discussed environmental standards.

In more specific terms the present invention comprises a method and apparatus for the treatment of wastewater effluent from laundered household wash or a laundromat wherein the effluent is collected in a first tank for equalization for at least about ½ hour to a pH between 8.5 to 11 and then passed to a second tank for acidification to a first pH of not less than about 6.5 and preferably from about 6.5 to 6.9, and then a coagulant, preferably a polyaluminum chloride with a basicity of 45 to 50%, is added to effect a second pH of not less than about 5.0 and preferably from about 5.2 to 5.4 to coagulate at the second pH to form treated water and a sludge. The treated water is removed from the second tank, filtered to remove 1 to 50 micron particulates and passed through weak base anion exchange resin to remove MBAS. The treated water is then finally pH adjusted to about 6.5 to 8.5. This finally treated water meets the afore-discussed environmental standards for surface or sub-surface discharge, or optionally may be sanitized such as by ozonation or UV treatment for recycle as feedwater to the laundromat. Before equalization, the wastewater effluent need only be grossly filtered to remove particulates greater than about 300 microns.

DESCRIPTION OF THE PREFERRED EMBODIMENTS

Figure 3:
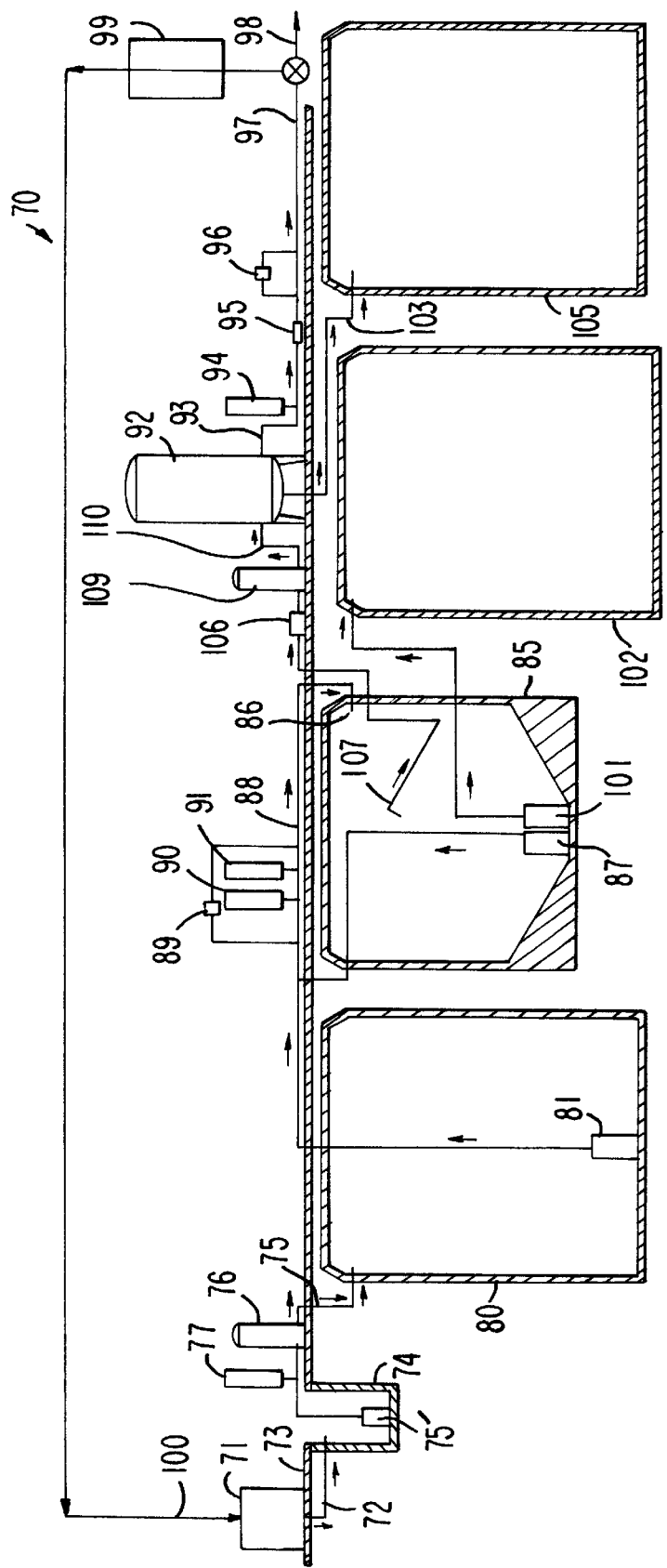
FIG. 3 is a flowsheet illustration of the wastewater treatment system of the present invention.

Referring to FIG. 3 there is shown the present invention 70. A laundromat is generally designated as 71, with wastewater effluent 72 being discharged from laundromat 71. The effluent discharge is between 8,000 to 35,000 gallons/day and has the following broad range of characteristics:

| MBAS | 35–130 ppm |
|---|---|
| TSS | 70–130 ppm |
| TDS | 350–775 ppm |
| Oil and grease | 30–80 ppm |
| pH | 8.5–11.0 |

Figure 1:
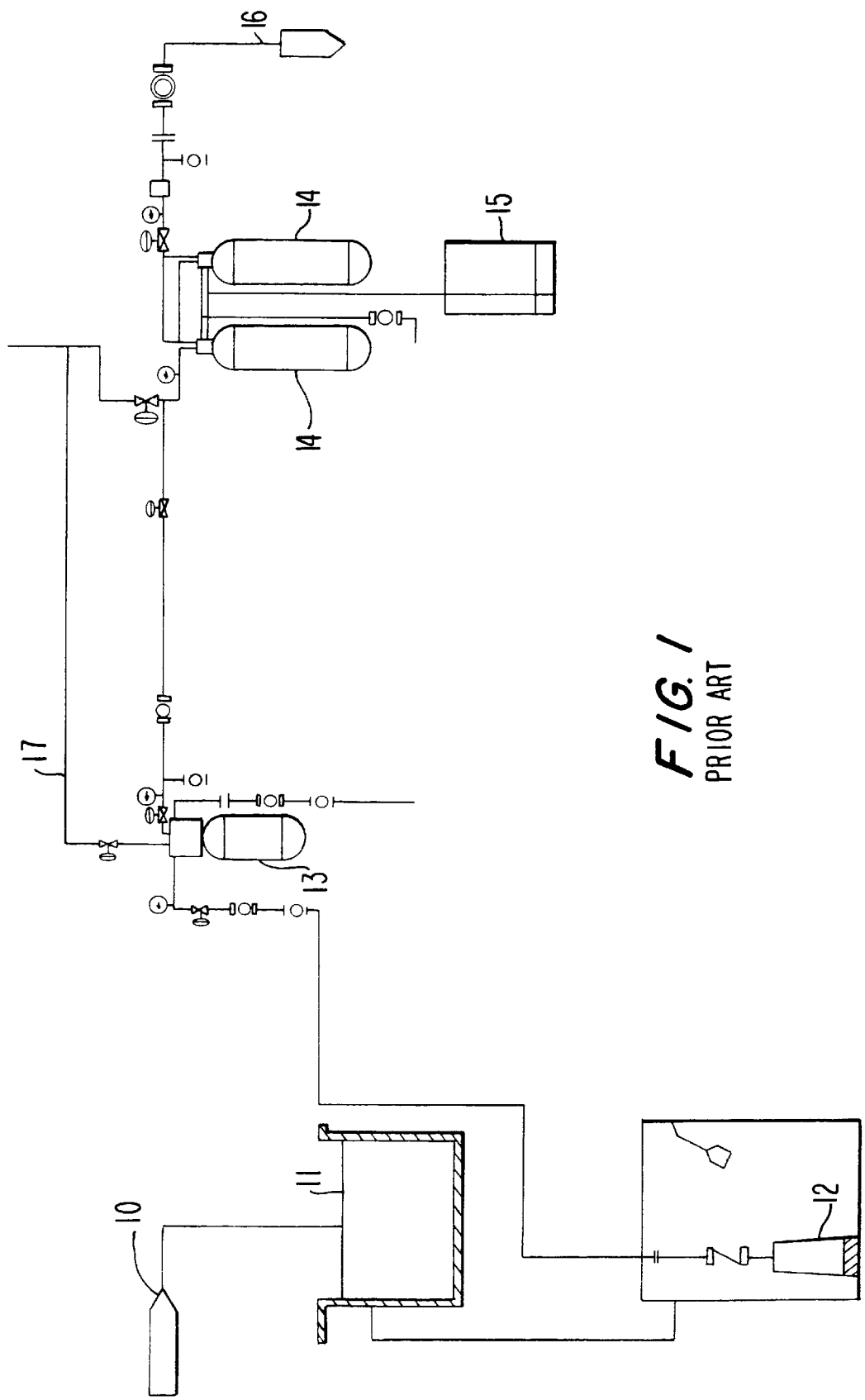
FIG. 1 is a flowsheet illustration of a prior art wastewater treatment system.
Figure 2:
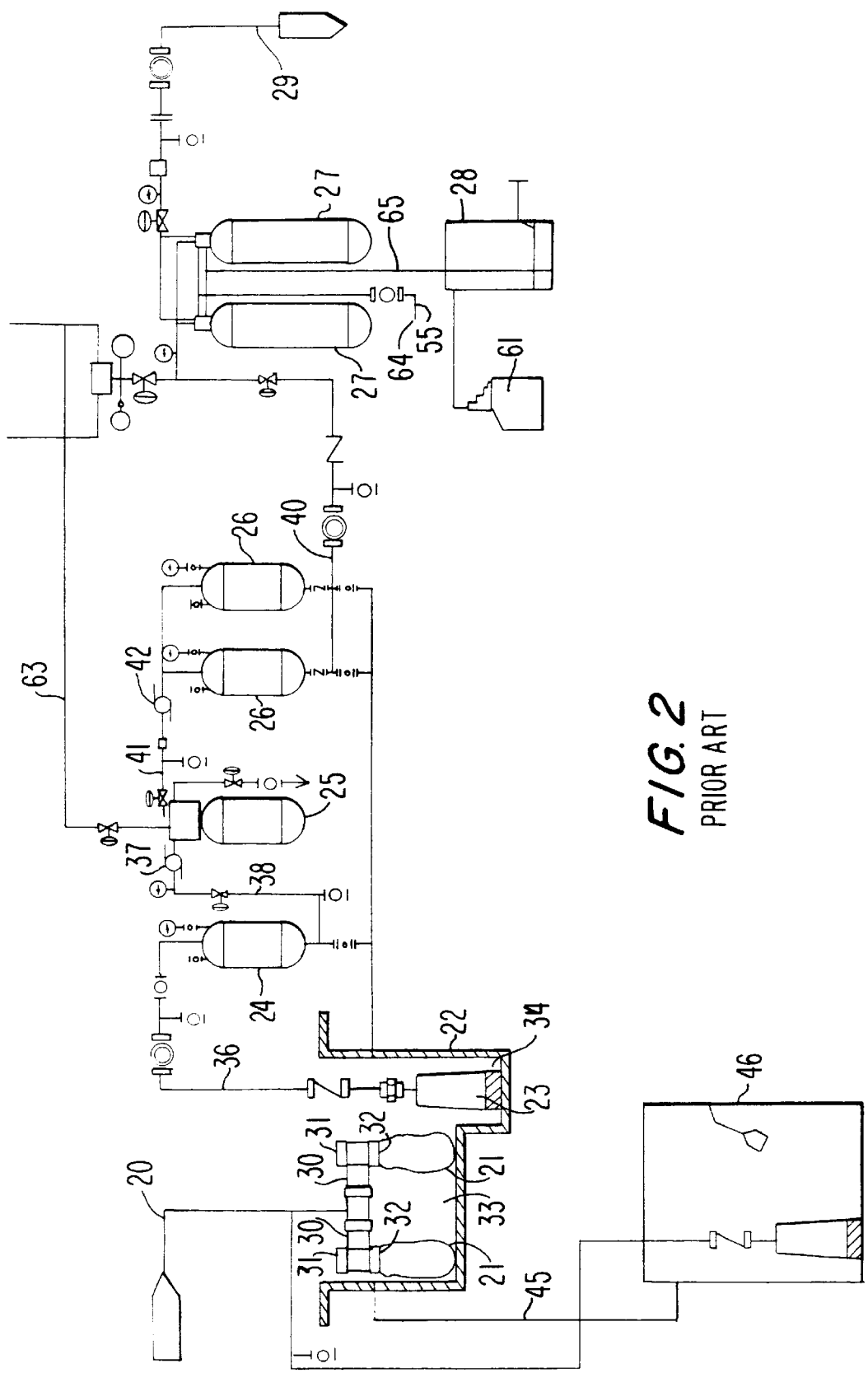
FIG. 2 is a flowsheet illustration of another prior art wastewater treatment system.

The wastewater effluent gravity flows below ground level 73 to an in-ground lint trap 74. Lint trap 74 is designed to settle out or remove particles greater than 300 microns. One such suitable lint trap design is shown as trap 22 in FIG. 2. The water in trap 74 is pumped by sump pump 75' to bag filter 76 which is designed to remove particles greater than 300 microns, and may be used optionally or in conjunction with trap 74 to ensure removal of 300 micron particulates prior to further treatment. It has been found that after lint trap particulate removal, lint or like particles of less than 300 microns agglomerate to form particles greater than 300 microns, in which case the bag filter 76 may be employed in addition to trap 74. A Harmsco BBMP bag filter is preferred. A pre-acidification feed tank 77 is disposed in line to add an acidifying agent such as sulfuric acid for purposes hereinafter appearing.

The filtered water 75 from bag filter 76 or directly from lint trap 74 is transferred below ground level to in-ground equalization tank 80. Wastewater from filter 76 or trap 74 is collected and held in tank 80 so that all the wastewater including the last collected wastewater is held in tank 80 for at least the average wash cycle time which was determined to be 24.5 minutes or at least about ½ hour. It was found that this time was necessary for diverse characteristics such as detergent types, concentration, and temperature to equalize, and the entire contents of the tank would then be at a specific pH between 8.5 to 11 and at a uniform temperature. This equalization was found necessary for controlled treatment of the large and diverse effluent volumes. After equalization pump 81 transfers the equalized wastewater to batch treatment tank 85 as at inlet 86. Tank 85, like tank 80, is in-ground for insulation for operating at a more uniform temperature absent such in-ground construction.

Tank 85 is filled to a pre-determined level at which level float actuation switch (not shown) actuates pump 87 to recirculate the water through line 88. A pH sensor or controller 89, such as manufactured by Advantage Controls, Inc. and Pulsafeeder, Inc., are well known in the art. The controller 89 senses the pH and actuates acid supply or feed 90 to add an acidifying agent such as sulfuric acid to line 88. A partial or pre-acidification may optionally be used by feed 77. The acidification continues until a predetermined pH of about 6.5 to 6.9 and preferably about 6.8, is attained at which point the acid feed 90 is shut off by controller 89, and coagulant supply or feed 91 is actuated to feed an acidifying coagulant, particularly a metal-halo coagulant and preferably a polyaluminum chloride (PAC) to line 88 and then into tank 85. The coagulant is added until the pH controller sensor 89 senses a pH of about 5.2 to 5.4 which then activates shut down of the coagulant supply 91 and pump 87.

The pH specific water-coagulant mixture is allowed to settle for a minimum predetermined time of at least ½ to ¾ hour, and preferably 2 to 3 hours. After the termination of the pre-set coagulation time, self-priming pump 106 is automatically actuated to decant the nascent water by float arm 107 to remove the water from the coagulated sludge and from tank 85.

The removed water is pumped to cartridge filter 109 for removal of 1 to 50 micron particulates. The cartridge filter is preferably 20 micron rated. A Harmsco HIF24 is the preferred cartridge filter. The filtered water 110 is passed through ion exchange resin tank 92 which is packed with a weak base anion exchange resin to remove MBAS. One preferred weak base anion exchange resin is WBMP (i.e., weak base macro porous) resin in sulfate form manufactured by Resintech, Inc. The treated water 93 is acidic and then mixed with caustic or basifying agent from caustic feed 94 in in-line mixer 95. A pH sensor controller 96, such as afore-described senses the pH after mixer 95 and when the pH is 6.8 to 8.5, and preferably about 7.0, the caustic feed is shut off. This provides continuous monitoring and regulation of the pH of the treated wastewater. The treated wastewater at 97 has the following maximum criteria:

| MBAS | 1.0 ppm |
|---|---|
| TSS | 30.0 ppm |
| TDS | 1000 ppm |
| Oil and grease | 15 ppm |
| pH | 6.5–8.5 |

This treated wastewater may be pumped as at 98 directly to subsurface leaching pools (not shown) or, optionally, may be sanitized by ozone generation or ozonator 99 for recycle as feedwater 100 to laundromat 71. One suitable ozone generator for ozonation of the wash water for recycle feedwater is shown and described in U.S. Pat. No. 5,097,556 issued Mar. 24, 1994 to Engel et al.

The ion exchange resin must periodically be cleaned. The weak base ion exchange resin is cleaned with back wash and acid (optional) to remove PAC-reactant contaminants, and then 2 to 4% caustic added and then the caustic is flushed, and 2 to 4% sulfuric acid added, and finally flushed until the pH of the wash is about 4 to 5.

After decanting the nascent water from tank 85 to effect a predetermined lower level in the tank, a level switch is actuated to shut off self-priming pump 106 and simultaneously actuate sludge pump 101 to pump the sludge to sludge holding tank 102. The sludge is then further settled out and removed by septic tank handlers for off-site disposal. The waste regenerant solution 103 from ion exchange resin tank 92 is collected in tank 105 and likewise periodically removed by commercial septic tank handlers for off-site disposal.

Suitable coagulants pursuant to the present invention are generally those which further acidify the acidified wastewater to a moderate pH at which there is effective coagulation. It has been found that metal-halo coagulants and their derivatives are useful including wherein the metal is preferably Al and the halide is Cl, Br or I or mixtures thereof, and preferably Cl. The preferred metal-halo coagulants are polyaluminum chlorides (PAC), aluminum chlorohydrates, and polyDADMAC, and polymer mixtures or derivatives thereof. The most preferred coagulant is polyaluminum chloride (PAC). PAC solutions are commercially available in broad ranges of polymerization with basicities ranging from above zero up to 83%. It has been found, however, that a PAC with a basicity of 45 to 50% is most preferred. It has also been found that a PAC with extremely low sulfates of less than 100 ppm is most preferred and may prevent interference with the weak base anion exchange resin reaction. It is also most preferred that the PAC be essentially free of Fe as this will cause corrosion and discoloration, which discoloration must be avoided particularly where the treated water is recycled as laundromat feedwater. An afore-described most preferred PAC is commercially available from Geo Specialty Chemicals, Little Rock, Ark.

The above-described apparatus provides a part batch treatment method which however effectively provides essentially continuous treatment and possible recycle of laundromat wastes. The continuously treated water meets the aforesaid rigorous environmental criteria for ground water discharge. The method provides an essentially continuous operation, with minimal downtime and maintenance, which maintenance is readily and simply achieved such as by regular but infrequent filter cleaning or replacement, and sludge removal.

Since other modifications and changes varied to fit particular operating requirements and environment, will be apparent to those skilled in the art, the invention is not considered limited to the example chosen for purposes of disclosure, and covers all changes and modifications which do not constitute departures from the spirit and scope of this invention.

It will be appreciated that modifications may be made in the system and apparatus described hereinabove in keeping within the scope of the present invention, as defined in the appended claims.

What is claimed is:

1. A method of treating wastewater effluent from laundered household wash comprising:

(a) adding an acidifying agent to the wastewater to a first predetermined pH;
   (b) adding a coagulant to the wastewater at said first pH to effect a second predetermined pH, said second pH being lower than said first pH, and allowing coagulation of the wastewater at said second pH to form a sludge and treated water; and
   (c) separating the treated water from the sludge.

2. The method of claim 1, wherein the second pH is not less than about 5.0.

3. The method of claim 2, wherein the first pH is not less than about 6.5.

4. The method of claim 3, wherein the oil and grease concentration in the treated water is less than about 15 ppm.

5. The method of claim 3, further comprising equalizing the effluent before step (a), and (d) filtering the treated water from step (c) to remove from about 1 to 50 micron particles.

6. The method of claim 5, further comprising (e) passing the filtered water from step (d) through a weak base anion exchange resin.

7. The method of claim 6, wherein the treated water from step (e) comprises no more that about:

| Methylene blue active substances | 1.0 ppm |
|---|---|
| Total suspended solids | 30.0 ppm |
| Total dissolved solids | 1000 ppm |
| Oil and grease | 15 ppm. |

8. The method of claim 7, wherein the wastewater effluent to step (a) comprises:

| Methylene blue active substances | 60–130 ppm |
|---|---|
| Total suspended solids | 70–130 ppm |
| Total dissolved solids | 300–775 ppm |
| Oil and grease | 30–80 ppm. |

9. The method of claim 8, said first pH being from about 6.5 to 6.9, said second pH being from about 5.2 to 5.4 and further comprising (f) adding a basifying agent to the water from step (e) to adjust the pH to approximately 6.5 to 8.5.

10. The method of claim 9, further comprising (g) sanitizing the treated water of step (f) to remove bacterial matter, and (h) recycling the treated water.

11. The method of claim 1, wherein the adding of the coagulant is stopped when the wastewater is first sensed at said second pH.

12. The method of claim 5, wherein the equalizing is for a period of time at least equal to the time of an average wash cycle.

13. The method of claim 12, further comprising removing particles of greater than about 300 microns from the wastewater effluent before equalizing.

14. The method of claim 13, said equalizing further comprising holding said effluent in a first tank for at least ½ hour.

15. The method of claim 14, further comprising transferring the wastewater from the first tank to a second tank, and adding said acidifying agent and then said coagulant to said wastewater transferred from the first tank.

16. The method of claim 15, where step (b) is for about 2 to 3 hours.

17. The method of claim 1, wherein the coagulant is a polyaluminum chloride (PAC).

18. The method of claim 17, wherein the PAC comprises a basicity of from about 45 to 50%, and the second pH is not less than about 5.0.

19. The method of claim 18, wherein the oil and grease in the treated water is less than 15 ppm.

20. The method of claim 17, wherein the wastewater is substantially free of toxic heavy metal chelating or solubilizing compounds and the treated water is substantially free of toxic heavy metals.

21. A method for treating wastewater effluent from laundered household wash comprising adding an acidifying agent to the wastewater to a first predetermined pH, and then adding an acidifying coagulant wastewater to effect a second predetermined pH, said second pH being lower than said first pH, sensing the pH of the wastewater with the added coagulant, and stopping adding the coagulant when the wastewater is sensed at said second pH, and allowing coagulation of the wastewater to form a sludge and treated wastewater, and separating the treated wastewater from the sludge.

22. The method of claim 21, wherein the second pH is not less than about 5.0 and the first pH is not less than about 6.5.

23. The method of claim 22, wherein the oil and grease concentration of the treated wastewater is less than 15 ppm.

* * * * *